(12) United States Patent
Jones et al.

(10) Patent No.: US 7,607,081 B1
(45) Date of Patent: Oct. 20, 2009

(54) STORING DOCUMENT HEADER AND FOOTER INFORMATION IN A MARKUP LANGUAGE DOCUMENT

(75) Inventors: Brian Jones, Redmond, WA (US); Robert Little, Redmond, WA (US); Marcin Sawicki, Kirkland, WA (US); Daniel Robert Snyder, Bellevue, WA (US); Andrew Bishop, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 242 days.

(21) Appl. No.: 10/731,242

(22) Filed: Dec. 9, 2003

Related U.S. Application Data

(63) Continuation-in-part of application No. 10/187,060, filed on Jun. 28, 2002, now Pat. No. 7,523,394.

(51) Int. Cl.
*G06F 17/24* (2006.01)
*G06F 17/30* (2006.01)
*G06F 17/15* (2006.01)

(52) U.S. Cl. .................. 715/234; 715/205; 715/206; 715/243; 715/248

(58) Field of Classification Search .......... 715/523, 715/537, 513, 531, 517, 522, 525, 251, 248, 715/234, 205, 206, 243; 709/202, 203, 224; 707/10
See application file for complete search history.

(56) References Cited

U.S. PATENT DOCUMENTS

| | | | |
|---|---|---|---|
| 4,751,740 A * | 6/1988 | Wright | 382/180 |
| 4,864,501 A | 9/1989 | Kucera et al. | 704/8 |
| 4,866,777 A | 9/1989 | Mulla et al. | 704/206 |
| 5,185,818 A | 2/1993 | Warnock | 382/112 |
| 5,295,266 A | 3/1994 | Hinsley et al. | 718/101 |
| 5,557,722 A | 9/1996 | DeRose et al. | 715/234 |
| 5,579,466 A | 11/1996 | Habib et al. | 715/255 |
| 5,586,241 A | 12/1996 | Bauermeister et al. | 345/467 |
| 5,781,714 A | 7/1998 | Collins et al. | 345/471 |
| 5,787,451 A | 7/1998 | Mogilevsky | 715/257 |

(Continued)

FOREIGN PATENT DOCUMENTS

EP      1 230 566      2/2005

OTHER PUBLICATIONS

Altamura et al, Transforming paper documents into XML format with Wisdom++, Nov. 7, 2000, IJDAR, 6-12.*

(Continued)

*Primary Examiner*—Stephen S Hong
*Assistant Examiner*—Wilson Tsui
(74) *Attorney, Agent, or Firm*—Merchant & Gould; Ryan T. Grace

(57) ABSTRACT

The present invention represents header and footer structures in a markup language (ML) document. The ML document may be parsed by applications that understand ML other than the application that generated the ML document. The ML document may be manipulated on a server or anywhere even when the application creating the ML document is not present. The header or footer originally used in the ML document may be manipulated when the ML document is parsed by other applications. Header and footer information (i.e., properties) are saved in a markup language (ML) document without data loss, while allowing the header and footer structures to be parsed by ML-aware applications and to be read by ML programmers.

16 Claims, 5 Drawing Sheets

U.S. PATENT DOCUMENTS

| | | | | |
|---|---|---|---|---|
| 5,859,648 | A | 1/1999 | Moore et al. | 345/471 |
| 5,881,225 | A | 3/1999 | Worth | 726/17 |
| 5,895,476 | A | 4/1999 | Orr et al. | 715/202 |
| 6,023,714 | A | 2/2000 | Hill et al. | 715/513 |
| 6,031,989 | A | 2/2000 | Cordell | 717/109 |
| 6,044,387 | A | 3/2000 | Angiulo et al. | 715/257 |
| 6,092,068 | A | 7/2000 | Dinkelacker | 707/100 |
| 6,119,136 | A | 9/2000 | Takata et al. | 715/234 |
| 6,141,754 | A | 10/2000 | Choy | 726/1 |
| 6,182,029 | B1 | 1/2001 | Friedman | 704/9 |
| 6,209,124 | B1 | 3/2001 | Vermeire et al. | 717/114 |
| 6,230,173 | B1 | 5/2001 | Ferrel et al. | 715/234 |
| 6,233,592 | B1 | 5/2001 | Schnelle et al. | 715/234 |
| 6,249,794 | B1 | 6/2001 | Raman | 715/413 |
| 6,336,124 | B1 | 1/2002 | Alam et al. | 715/423 |
| 6,397,232 | B1 | 5/2002 | Cheng-Hung et al. | 715/249 |
| 6,507,856 | B1 | 1/2003 | Chen et al. | 715/234 |
| 6,507,857 | B1 | 1/2003 | Yalcinalp | 715/234 |
| 6,512,531 | B1 | 1/2003 | Gartland | 715/854 |
| 6,519,617 | B1 | 2/2003 | Wanderski et al. | 715/234 |
| 6,535,896 | B2 | 3/2003 | Britton et al. | 715/249 |
| 6,538,673 | B1 | 3/2003 | Maslov | 715/853 |
| 6,613,098 | B1 | 9/2003 | Sorge et al. | 715/234 |
| 6,675,353 | B1 | 1/2004 | Friedman | 715/234 |
| 6,697,999 | B1 | 2/2004 | Breuer et al. | 715/243 |
| 6,725,423 | B1 | 4/2004 | Muramoto et al. | 715/234 |
| 6,725,426 | B1* | 4/2004 | Pavlov | 715/523 |
| 6,754,648 | B1 | 6/2004 | Fittges et al. | 707/1 |
| 6,763,500 | B2 | 7/2004 | Black et al. | 715/234 |
| 6,785,685 | B2 | 8/2004 | Soetarman et al. | 707/101 |
| 6,799,299 | B1 | 9/2004 | Li et al. | 715/234 |
| 6,829,570 | B1 | 12/2004 | Thambynayagam et al. | 703/10 |
| 6,829,745 | B2 | 12/2004 | Yassin et al. | 715/234 |
| 6,845,483 | B1* | 1/2005 | Carroll | 715/513 |
| 6,886,115 | B2 | 4/2005 | Kondoh et al. | 714/52 |
| 6,918,086 | B2 | 7/2005 | Rogson | 715/257 |
| 6,928,610 | B2 | 8/2005 | Brintzenhofe et al. | 715/202 |
| 6,938,204 | B1 | 8/2005 | Hind et al. | 715/209 |
| 6,941,510 | B1 | 9/2005 | Ozzie et al. | 715/234 |
| 6,954,898 | B1 | 10/2005 | Nakai et al. | 715/262 |
| 6,968,503 | B1 | 11/2005 | Chang et al. | 715/526 |
| 6,996,772 | B2* | 2/2006 | Justice et al. | 715/513 |
| 7,028,009 | B2 | 4/2006 | Wang et al. | 705/51 |
| 7,257,772 | B1 | 8/2007 | Jones et al. | 715/234 |
| 7,275,209 | B1 | 9/2007 | Jones et al. | 715/234 |
| 7,376,650 | B1 | 5/2008 | Ruhlen | 707/6 |
| 7,389,473 | B1 | 6/2008 | Sawicki et al. | 715/255 |
| 2001/0014900 | A1 | 8/2001 | Brauer et al. | 707/234 |
| 2001/0032217 | A1 | 10/2001 | Huang | 715/239 |
| 2002/0087702 | A1 | 7/2002 | Mori | 709/224 |
| 2002/0091725 | A1 | 7/2002 | Skok | 707/501.1 |
| 2002/0124115 | A1 | 9/2002 | McLean et al. | 709/310 |
| 2002/0184189 | A1 | 12/2002 | Hay et al. | 707/1 |
| 2003/0007014 | A1 | 1/2003 | Suppan et al. | 345/853 |
| 2003/0018668 | A1 | 1/2003 | Britton et al. | 715/230 |
| 2003/0101416 | A1 | 5/2003 | McInnes et al. | 715/234 |
| 2003/0135584 | A1 | 7/2003 | Roberts et al. | 709/218 |
| 2003/0163784 | A1 | 8/2003 | Daniel et al. | 715/209 |
| 2003/0167444 | A1 | 9/2003 | Zorc | 715/234 |
| 2003/0231626 | A1 | 12/2003 | Chuah et al. | 370/389 |
| 2004/0073871 | A1 | 4/2004 | Giannetti | 715/201 |
| 2004/0098320 | A1 | 5/2004 | Mitsuhashi et al. | 705/27 |
| 2004/0194035 | A1* | 9/2004 | Chakraborty | 715/531 |
| 2004/0205553 | A1* | 10/2004 | Hall et al. | 715/513 |
| 2004/0210818 | A1 | 10/2004 | Jones et al. | 715/236 |
| 2005/0102265 | A1 | 5/2005 | Jones et al. | 707/1 |
| 2005/0108198 | A1 | 5/2005 | Jones et al. | 707/1 |
| 2005/0108278 | A1 | 5/2005 | Jones et al. | 707/102 |

OTHER PUBLICATIONS

Klink et al, Document Structure Analysis Based on Layout and Textual Features, Sep. 25, 2000, DFKI, p. 1a, 3, 4, and 11.*

Creating DocBook Documents, Aug. 2, 2001, pp. 1 and 16 http://web.archive.orb/web/20020615124747/www.docbook.org/tdg/en/html/ch02.html.*

David Eisenberg, Using XSL Formatting Objects, Jan. 17, 2001, pp. 1a and 1 http://www.xml.com/pub/a/2001/01/17/xsl-fo/index.html?p.=2.*

"Star Office XML File Format Working Draft", Published: Jan. 2001, Publisher: Sun Microsystems, Draft 10, pp. 19 and 234, http://web.archive.org/web/20010603030227/xml.openoffice.org/xml_specification_draft.pdf.*

Sun Microsystems, "StarOffice XML File Format Working Draft", Jan. 2001, Draft 10, pp. 19, 89, 142, and 234.*

Sun Microsystems, "StarOffice XML File Working Draft", Jan. 2001, Draft 10, pp. 48, 49, 51, 54-58.*

Rick Jelliffe, "Weak Validation", published: Jul. 1999, Publisher: Academia Sinica Computing Centre, pp. 1-4.*

Y. Ishitani, "Document Transformation System from Papers to XML Data based on Pivot XML Document Method", IEEE Computer Society, Seventh International Conference on Document Analysis and Recognition, 6 pgs., Aug. 3-6, 2003.

Pradeep Jain;,"Creating XML from Microsoft Word: The Challenges", Dec. 3-8, 2000, pp. 136-144.

Jon Bosak, "XML: The Universal Publishing Format", 1998, pp. 1-2.

M. Fernandez et al., "Advanced Technology Seminar", p. 323, Feb. 21, 2002.

Uros Novak et al., "Experimental XSLT Processor for Objects", Proceedings of the IASTED International Conference, Applied Informatics, Feb. 18-21, 2002, pp. 277-282.

"XML Schema Part 1: Structures", W3C Recommendation, May 2, 2001, downloaded from http://www.w3.org/TR2001/REC-xmlschema-1-20010502/, pp. 1-19.

HyperVision, Ltd., "WorX 2.1 Authoring Guide for XML 2001", Sep. 2001, downloaded from http://www.xmlconference.org/xmlusa/2001/XML2.1AuthoringGuideforXML2001.pdf, pp. 1-29.

Ayers, Larry, "AbiWord's Potential", Linux Gazette, Issue 43, Jul. 1999, pp. 1-4.

"XML Schema for AbiWord Markup Language", downloaded from http://www.abisource.com/awml.xsd, May 27, 2000, pp. 1-3.

Wen, Howard, "AbiWord: Open Source's Answer to Microsoft Word", Linux Dev Center, downloaded from http://www.linuxdevcenter.com/lpt/a/1636, Mar. 14, 2002, pp. 1-3.

Dzuba, Vassili, "Majix 1.0: A Word to XML Converter", downloaded from http://xml.coverpages.org/majix10Ann.html, Oct. 6, 1998, pp. 1-2.

Schmelzer, Ronald, "ZapThink Briefing Note—HyperVision—Automating Valid XML Document Creation Within Microsoft Word", ZapThink LLC, Feb. 8, 2002, pp. 1-6.

Moseley, Lonnie et al., "Mastering Microsoft Office 97 Professional Edition", Sybex, 1996, pp. 87, 94-98, 103-105, 165-179, 1114-1115.

"AbiWord", http://en.wikipedia.org/wiki/AbiWord>, Oct. 19, 2005, 2 pgs.

Walther, P., "XML Dokumente in Microsoft Word mit neuem Produkt der struktur AG kostenlos testen", http://www.contentmanager.de/magazine/news_h2695_xml_dokumente_in_microsoft_word_mit_neuem.html>, Jun. 5, 2002, 2 pgs.

Chipr, "AbiWord—Word Processing For Everyone", http://www.kuro5hin.org/?op=displaystory;sid=2002/4/22/22406/9615>, Apr. 23, 2002, 8 pgs.

"Introduction to AbiWord", http://web.archive.org/web/20010608211934/www.abisource.com/help/en-US/index.htm, Jun. 8, 2001, 3 pgs.

"XML Schema for Abi Word Markup Language", http://vvww.abisource.com/awml.xsd>, Apr. 27, 2000, 3 pgs.

Liefke, Harmut et al., "Xmill: An Efficient Compressor for XML Data", SCM Sigmod Record, vol. 29, Issue 2, May 2000, pp. 153-164.

McGrath, Robert, "Representing "Binary" Data in XML", downloaded from http://ndf.ncsa.uiuc.edu/HDF5/XML/tools/binary.html, Mar. 2001, pp. 1-4.

Jeong, Euna et al., "Semistrutured Data: Induction of Integrated View for XML Data With Heterogeneous DTDs", Proceedings of the Tenth International Conference on Information and Knowledge Management, Oct. 2001, pp. 151-158.

"XML Schema—Lecture 4 Notes", downloaded from http://www.cs.rpi.edu/~punini/XMLJ/classes/class4/all.html, Nov. 21, 2001, pp. 1-14.

Mansfield, Ron, "Mastering Word 97 Fourth Edition", 1997, Sybex, pp. 269-270, 412, 449-457, 985-986, 1010-1011, 1028-1029, 1031-1034.

M. Schrage, "Proxima, A presentation-oriented editor for strucctured documents", IPA, ISBN 12-345-6789-0, Jun. 4, 1973, pp. 1-186.

V. Turau, "Making legacy data accessible for XML applications", University of Applied Sciences, Department of Computer Science, Wiesbaden, Germany, 1999, pp. 1-11.

M. Kirjavainen, "XML Browsers", http://mia.ece.uic.edu/~papers/WWW/MultimedicaStandards/XML_browsers.pdf, last accessed Mar. 14, 2005, 16 pgs.

Rusty Elliotte, "XML Bible", IDG Books Worldwide, Inc., 1999, pp. 1-12, 120-127, 333-335.

Microsoft, "Microsoft Word 2000", 1999, Microsoft, Screenshots 1-7, pp. 1-2.

Oliver Meyer, "Creating Validated XML Documents on the Fly Using MS Word", Oct. 20, 2002, pp. 113-121.

"Introduction to XML" University of Washington Computing and Communications, copyright 1999, on the Internet as of Jun. 24, 2001, downloaded from http://web.archive.org/web/20010624123830/http://www.washington.edu/computing/training/540/xml_well.html, 1 pg.

Munro, J., "StarOffice 6.0 Lives Up to its Name", PCMAG.com, May 23, 2002, www.pcmag.com/print_article2/0,1217,a=27287,00.asp, downloaded pp. 1-3.

Castro, E., "XML for the World Wide Web, Visual Quickstart Guide", Peachpit Press, 2001, p. 245.

Rodriguez, M., "XML: Twig", xmltwig.com, copyright 2003, downloaded pp. 1-4, web.archive.org/web/20030422002 I 20/http://www.xmltwig.com/xmltwig/tools/xml_spellcheck.

Xmetal 1.0, Webreference.com, Oct. 29, 1999, downloaded pp. 1-2, www.webreference.com/html/watch/xmetal/5.html.

Altova Inc. & Altova GmbH, "XML Spy 4.0 Manual," copyright 1998-2001, Sep. 10, 2001, downloaded from: http://www.altova.com/download.sub.—archive.html and link, pp. 18-286.

"TEI, The XML Version of the TEI Guidelines" Text Encoding Initiative [TEI] Consortium, Copyright 2001, with Introductory Note, dated Mar. 2002, downloaded from: http://www.tei-c.org.uk/Drafts/P4/driver.xml, on Nov. 25, 2006, downloaded pp. 1-93.

M. Fernandez and S. Amer-Yahia; Advanced Technology Seminar 2—Techniques for Storing XML; pp. 323, 774-776.

Michael Champion; Storing XML in Databases; EAI Journal, Oct. 2001; pp. 53-55.

JP Morgenthal; XML for Data Integration; EAI Journal, Oct. 2001; pp. 13-14, 16.

Sihem Amer-Yahia, Mary Fernandez, Divesh Srivastava and Yu Xu; PIX; A System for Phrase Matching in XML Documents: A Demonstration; 2003 IEEE; pp. 774-776.

Altova Inc. & Altova GmbH, "XML Spy 4.0 Manual," copyright 1998-2001, published Sep, 9, 2001, pp. 1-401.

HV, Ltd., "WorX Standard Edition (SE) 'XML Authoring Made Easy," HyperVision, Ltd., published on the Internet as of Jun. 3, 2001 as a PDF file linked to http://web.archive.org/web/20010603152210/www.hvltd.com/default.asp?name=information/xml/wormeOverview.xml&display=information/xsl/default.xs1, pp. 1-9.

Mathias Neumuller and John N. Wilson; Improving XML Processing Using Adapted Data Structures; Oct. 7-10, 2002; pp. 206-220.

Ullas Nambiar et al.; Efficient XML Data Management: An Analysis; EC-Web 2002, LNCS 2455; pp. 87-98.

Volkan Atalay and Erkan Arslan; An SGML Based Viewer for Form Documents; 1999 IEEE Jul. 1999; pp. 201-204.

Xin Zhang et al.; Clock: Synchronizing Internal Relational Storage with External XML Documents; 2001 IEEE Jun. 2001; pp. 111-118.

Robert D. Cameron; REX: XML shallow parsing with regular expressions; Markup Languages: Theory & Practice 1.3, Summer 1999; pp. 61-88.

Danny Heijl; The Delphi XML SAX2 Component & MSXML 3.10; Dr. Dobb's Journal, Sep. 2001; pp. 42-54.

Torsten Grabs et al.; XMLTM: Efficient Transaction Management for XML Documents; CIKM'02, Nov. 4-9, 2002; pp. 142-152.

Michael Floyd, "Debugging XML Applications", Aug. 2000, www.webtechniques.com, pp. 79-81.

James E. Powell, "Microsoft Office Beta 2 on the Horizon", WinMag.com, Mar. 3, 2000.

Milbery, J., "WorX SE", XML Journal, published Feb. 4, 2001, downloaded from http://xml.sys-con.com/read/40149.htm, downloaded pp. 1-5.

Patrick Marshall, "DocuShare 2.0 Makes Web Document Management Work", Sep. 27, 1999.

Dan Franks, "Crowd Control (Secrets)", Jun. 6, 2002, MacWorld, vol. 19, No. 6, p. 102.

John Lombardi, "Word Pro Excels at 'Team' Work", Info World, Jan. 8, 1996, p. 86.

Kathy Yakal, "Elegant Document Distribution", Computer Shopper, Nov. 1995, pp. 1-2.

Jon Udell, "Getting Traction", Jul. 12, 2002.

"Star Office XML File Format Working Draft", Sun Microsystems, Inc., pp. 57, 59.

W. Wadge, "Intensional Markup Language", Proceedings of the Third International Workshop, DCW 2000, Quebec City, Canada, Jun. 19-21, 2000, pp. 82-89.

Unicode Inc., "Unicode Technical Reports", Sep. 21, 2002, pp. 1, 2, 638, 642, and 644.

Star Office XML File Format Working Draft, Sun Microsystems, Inc., pp. 1, 19, and 196.

Rohr, Paul, "RE: Styles Again", downloaded from http://www.abisource.org/mailinglists/abiword-dev/01/May/0561.html, May 2001, pp. 1-2.

W3C, "XML Schema Requirements", W3C Note, Feb. 15, 1999, downloaded from www.w3.org/TR/NOTE-xml-schema-req, pp. 1-5.

Ray, Erik T., "Learning XML", O'Reilly & Associates, Inc., Jan. 2001, cover, copyright, and Chapter 5 downloaded pp. 1-25.

Glenn, Walter, "Word 2000 in a Nutshell", O'Reilly & Associates, Inc., Aug. 2000, cover, copyright, and sections 16.4 and 16.3, downloaded pp. 1-8.

Liberty, J. et al., "XML Web Documents from Scratch", Que Corporation, Mar. 10, 2000, cover, copyright, chapters 1 and 2, downloaded pp. 1-16.

Watchorn, H. et al., "Word and XML: Making the 'Twain Meet'", XML Europe 2001, papers, May 2001, downloaded pp. 1-11.

Novak, U. et al., "Experimental XSLT Processor for Objects", Proceedings of the JASTED Int'l Conf. On Applied Informatics, Feb. 2002, pp. 277-282.

XML Workshop Ltd., "Word to XML Converters", Mar. 7, 2003, downloaded pp. 1-2.

"YAWC Pro 1.0 Installation & User Guide", pp. 1-11.

"Case Study: Converting Word Into XML", YAWC Pro, 1 pg.

"Case Study: Maintaining Websites with Microsoft Word", YAWC Pro, 1 pg.

"Case Study: Publishing Content to the Web and Mobile Phones", YAWC Pro., 1 pg.

"Case Study: Typsetting XML with QuarkXPress", YAWC Pro, 1 pg.

Skylar, D., "The Annotated Rainbow DTD, Rainbow Version 2.5", Electronic Book Technologies, Inc., Feb. 8, 1995, pp. 1-12.

Tetrasix, "Welcome to Tetrasix Web Site", re: MajiX, Apr. 18, 2001, downloaded pp. 1-3.

Infinity-Loop, Web Site Home Page, re: infinity-loop, Apr. 20, 2001, 1 pg.

Sun Microsystems, "The OpenOffice.org Source Project", Sun Microsystems, Inc., 2000, downloaded pp. 1-34.

Harold, Rusty Elliotte, "XML Bible", IDG Books Worldwide, 1999, pp. 369-388.

W3C, "XML Schema Part 0: Primer", W3C Recommendation, May 2, 2001, downloaded pp. 1-67.

Case Western Reserve University (CRWU), "Introduction to HTML", Case Western Reserve University and Eric A. Meyer, Mar.

4, 2000, downloaded from web.archive.org/web/20000304042655/ http://www.cwru.edu/help/introHTML/toc.html, downloaded pp. 1-157.

Lemay, Laura, "Teach Yourself Web Publishing with HTML 4 in 14 Days, Professional Reference Edition", Second Edition, Sams.net Publishing, 1997, pp. 778-789.

White, B. et al., "Standard Structural Elements" from "Web Content Accessibility Tips and Tricks", May 1, 2001, downloaded pp. 1-4.

Juran, J., "MML: The Modest Markup Language", Oct. 22, 2000, downloaded pp. 1-15.

University of Georgia Center for Continuing Education, "Exploring the World-Wide Web, Hypertext Markup Language", Feb. 24, 1999, downloaded pp. 1-7.

Cagle et al., "Professional XSL", Wrox Press Ltd., 2001, cover and copyright pp. 9-21.

Alschuler, Liora. "Getting the Tags In: Vendors Grapple With XML-Authoring, Editing and Cleanup", Seybold Report on Internet Publishing, vol. 5, No. 6. Feb. 2001, pp. 1-6.

J. Geigel et al., "Automatic Page Layout Using Genetic Algorithms for Electronic Albuming", Proceedings of Electronic Imaging, Jan. 21-26. 12 pgs.

Simpson, J., "Just XML", Prentice Hall, Second Edition. 2001, cover, copyright page, and p. 31.

Surajit Chaudhuri and Kyuseok Shim; Storage and Retrieval of XML Data using Relational Databases; Advanced Technology Seminar 4; Abstract: Mar. 5, 2003: p. 802.

YAWC Pro, "Welcome to YAWC Pro", Dec. 11. 2001. 1 pg.

Chiyoung Seo et al.: An efficient inverted index technique for XML documents using RDBMS; Received Jan. 16, 2002; Information and Software Technology 45 (2003). Jun. 1, 2002; pp. 11-22.

Castro, Elizabeth, "XML for the World Wide Web: Visual QuickStart Guide," Oct. 23, 2000, Peachpit Press, pp. 1-6.

Castro, Elizabeth, "XML for the World Wide Web", Published by Peachpit Press, 2001, pp. 182-184.

DevX Staff, "Twelve Dynamic HTML Lessons," downloaded from http://devx.com/projectcool/Article/18103/1763, published Jan. 1, 2000, pp. 1-3.

Harold, Rusty Elliotte, "XML Bible", IDG Books Worldwide, 1999, title page, copyright page, and pp. 1-15, 95-132, 191-200, 333-336, 352-360, and 433-567.

Linss, Peter, "CSS Namespace Enhancements (proposal)", Jun. 1999, W3C, pp. 1-7.

Mansfield, Ron, "Mastering Word 97 Fourth Edition", 1997, Sybex, pp. 221-222, 271-273, 278, 280, 283-284, 325-330, 539-540, 1015.

Meyer, Eric, "Cascading Style Sheets: HTML and CSS", May 2000, O'Reilly, pp. 1-17.

O'Reilly, "HTML & XHTML The Definitive Guide," 4th Edition, Copyright 2000, pp. 1-6, http://oreilly.jungles.ru/webdesign/xhtml/ch16_03.htm.

Scott Boggan and Micael De Laurentis, A System for Matching static or distortable fonts; May 1994; pp. 1-9; http://www.byte.com/art/940/sec12/art1.htm.

W3C, Fonts, Jan. 24, 2001, W3C, pp. 1-4, http://web.archive.org/web/20010124044900/http://www13.w3.org/TR/REC-CSS2/fonts.html#matching.

WayBack Machine, Feb. 15, 2006, p. 1, http://web.archive.org/web/*/http://www.w3.org/TR/REC-CSS2/fonts, html.

XHTML Examples, "XHTML explained—XHTML Examples," downloaded from http://web.archive.org/web/20020603200919/http://wwwjavascriptkit.com/howto/xhtml_intro4.Shtml, published Jun. 3, 2002, pp. 1-3.

U.S. Office Action mailed Nov. 26, 2008 cited in U.S. Appl. No. 10/727,288.

U.S. Advisory Action mailed Aug. 19, 2008 cited in U.S. Appl. No. 10/727,288.

Final Office Action mailed May 28, 2008 cited in U.S. Appl. No. 10/727,288.

U.S. Office Action mailed Nov. 27, 2007 cited in U.S. Appl. No. 10/727,288.

U.S. Office Action mailed Oct. 30, 2008 cited in U.S. Appl. No. 10/731,372.

* cited by examiner

STORING DOCUMENT HEADER AND FOOTER INFORMATION IN A MARKUP LANGUAGE DOCUMENT

RELATED APPLICATIONS

This patent application is a continuation-in-part application under 35 United States Code § 120 of U.S. patent application Ser. No. 10/187,060 filed on Jun. 28, 2002 now U.S. Pat. No. 7,523,394, which is incorporated herein by reference. An exemplary schema in accordance with the present invention is disclosed beginning on page 11 in an application entitled "Mixed Content Flexibility," Ser. No. 10/726,077, filed Dec. 2, 2003, which is hereby incorporated by reference in its entirety.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

The XML standard is considered by many as the ASCII format of the future, due to its expected pervasiveness throughout the hi-tech industry in the coming years. Recently, some word-processors have begun producing documents that are somewhat XML compatible. For example, some documents may be parsed using an application that understands XML. However, much of the functionality available in word processor documents is not currently available for XML documents.

SUMMARY OF THE INVENTION

The present invention is generally directed towards a method for storing header and footer information in a markup language (ML) document such as an XML document. Headers and footers may be generally understood as simple "mini-documents" that show up at the top and/or bottom of each page in a particular section of a document. Headers and footers simplify functions such as page numbering and template functions for providing a logo on each page of a document.

More particularly, the present invention relates to representing header and footer information in ML so that applications capable of reading a given ML file format, but running in environments where the header and footer generation information has not been installed, are able to still render the header and footer structures. The ML document may be manipulated on a server or anywhere even when the application creating the ML document is not present. Header and footer information (i.e., properties) are saved in a markup language (ML) document without data loss, while allowing the header and footer structures to be parsed by ML-aware applications and to be read by ML programmers.

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, the markup language specifies how the text is to be formatted or laid out, whereas in a particular customer schema, the ML tends to specify the text's meaning according to that customer's wishes (e.g., customerName, address, etc). The ML is typically supported by a word-processor and may adhere to the rules of other markup languages, such as XML, while creating further rules of its own.

The term "element" refers to the basic unit of an ML document. The element may contain attributes, other elements, text, and other building blocks for an ML document.

The term "tag" refers to a command inserted in a document that delineates elements within an ML document. Each element can have no more than two tags: the start tag and the end tag. It is possible to have an empty element (with no content) in which case one tag is allowed.

The content between the tags is considered the element's "children" (or descendants). Hence, other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Illustrative Operating Environment

Figure 1:
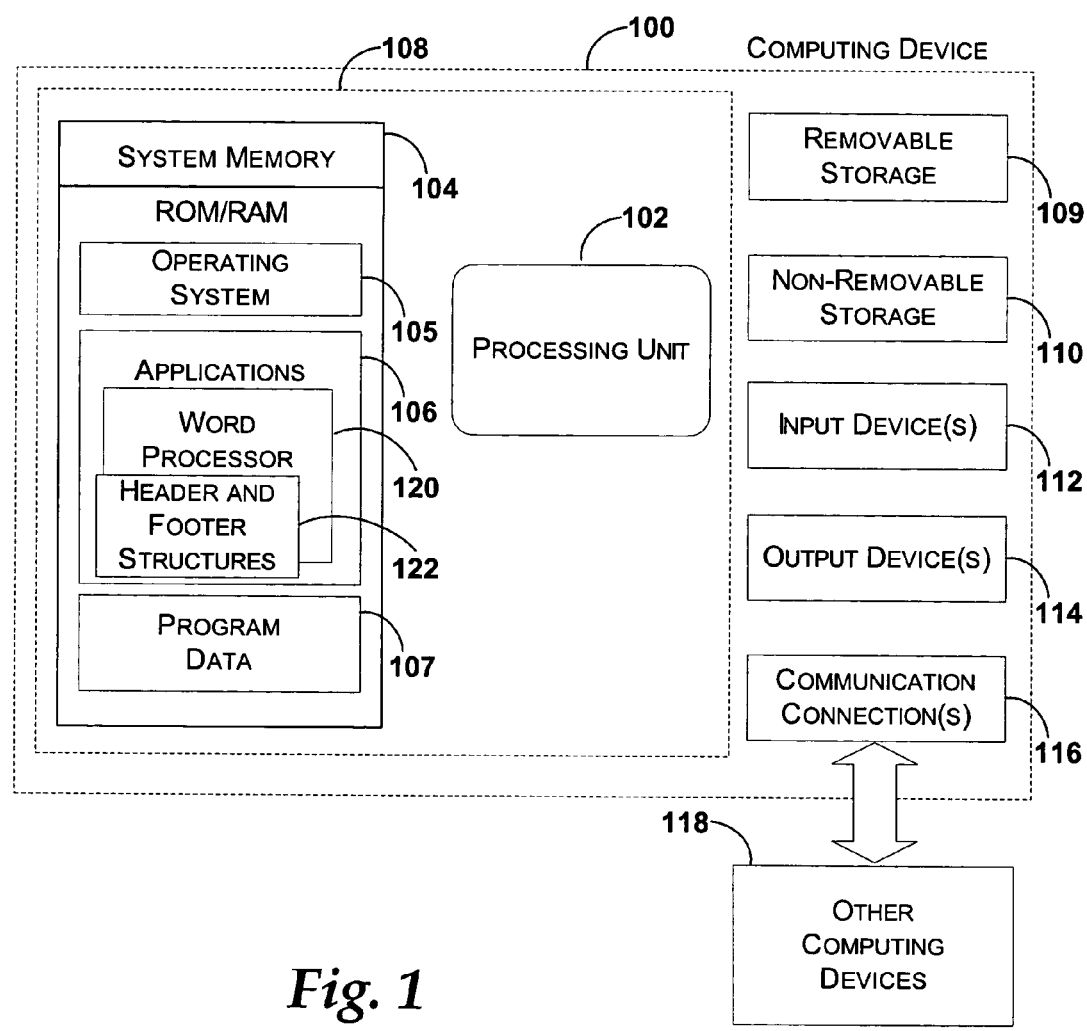
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes header and footer structures 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Generally, the present invention is directed at representing header and footer structures in an ML document. The ML document may be read by applications that do not share the same schema that created the document.

Figure 2:
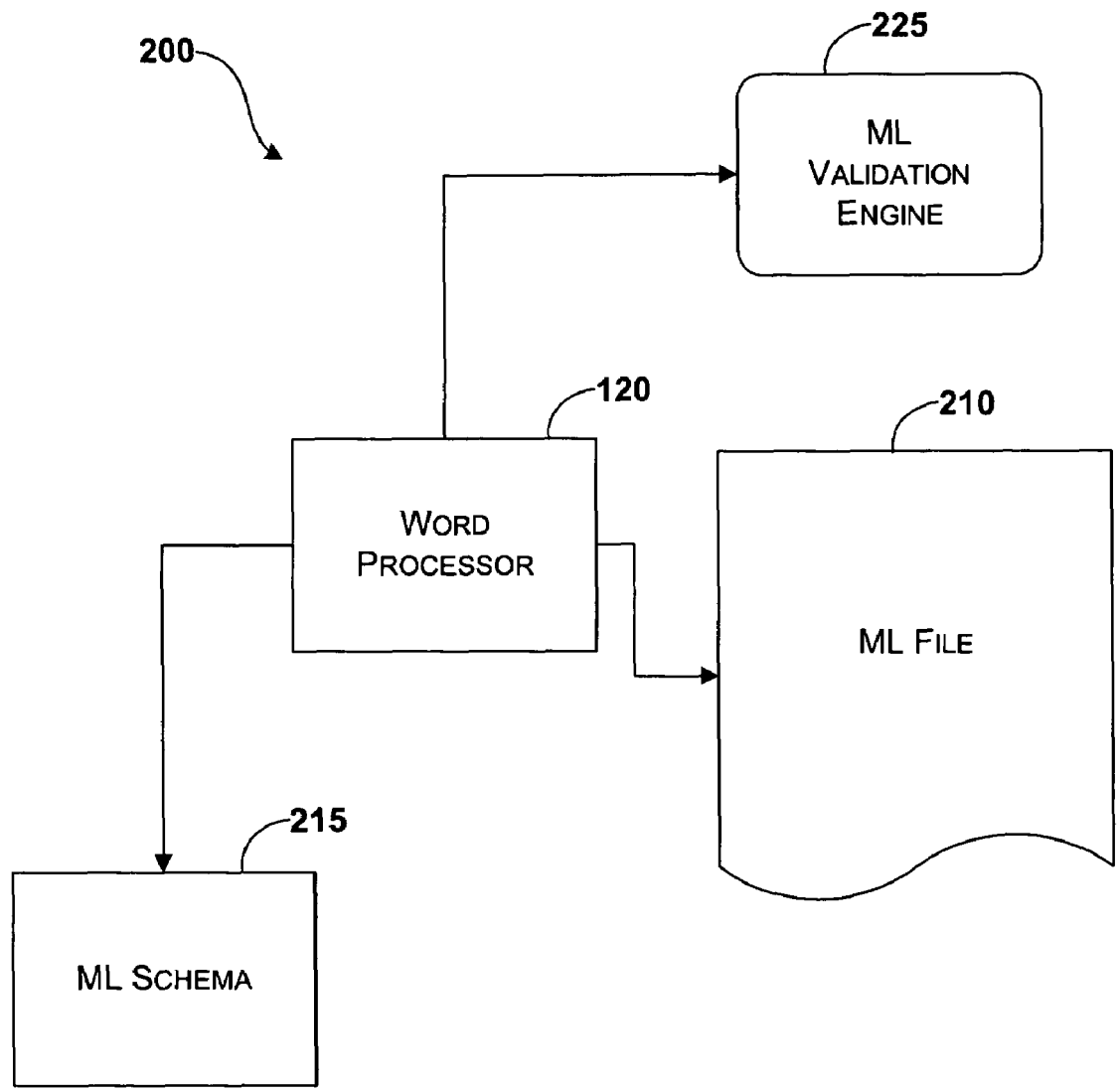
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, ML file 210, ML Schema 215, and ML validation engine 225.

In one embodiment, word-processor 120 has its own namespace or namespaces and a schema, or a set of schemas, that is defined for use with documents associated with word-processor 120. The set of tags and attributes defined by the schema for word-processor 120 define the format of a document to such an extent that it is referred to as its own native ML. Word-processor 120 internally validates ML file 210. When validated, the ML elements are examined as to whether they conform to the ML schema 215. A schema states what tags and attributes are used to describe content in an ML document, where each tag is allowed, and which tags can appear within other tags, ensuring that the documentation is structured the same way. Accordingly, ML 210 is valid when structured as set forth in arbitrary ML schema 215.

ML validation engine 225 operates similarly to other available validation engines for ML documents. ML validation engine 225 evaluates ML that is in the format of the ML validation engine 225. For example, XML elements are forwarded to an XML validation engine. In one embodiment, a greater number of validation engines may be associated with word-processor 120 for validating a greater number of ML formats.

Storing Header and Footer Information in a Markup Language Document

The present invention generally provides a method to represent an application's header and footer information in markup language (ML) such as XML. The header and footer structures may be parsed by applications that understand the markup other than the application that generated the ML file.

Headers and footers are used for a number of different applications. In one example, a footer is used to show the page number at the bottom of each page (like in this actual document), the author of the document may choose to create a footer. The footer is a "mini-document" that appears at the bottom of each page. A field is placed in the generated mini-document that instructs the footer to display the current page. With the use of the footer, a single mini-document is generated, but each time the mini-document appears, it shows the page number of that page. In another example, an author chooses to include the language "confidential" at the top of each page. To generate the "confidential" language on each page, a header is generated. The "mini-document" that is the header, therefore includes the text "confidential". As a result, each page includes a view of this mini-document such that the top of each page reads "confidential".

Figure 3:
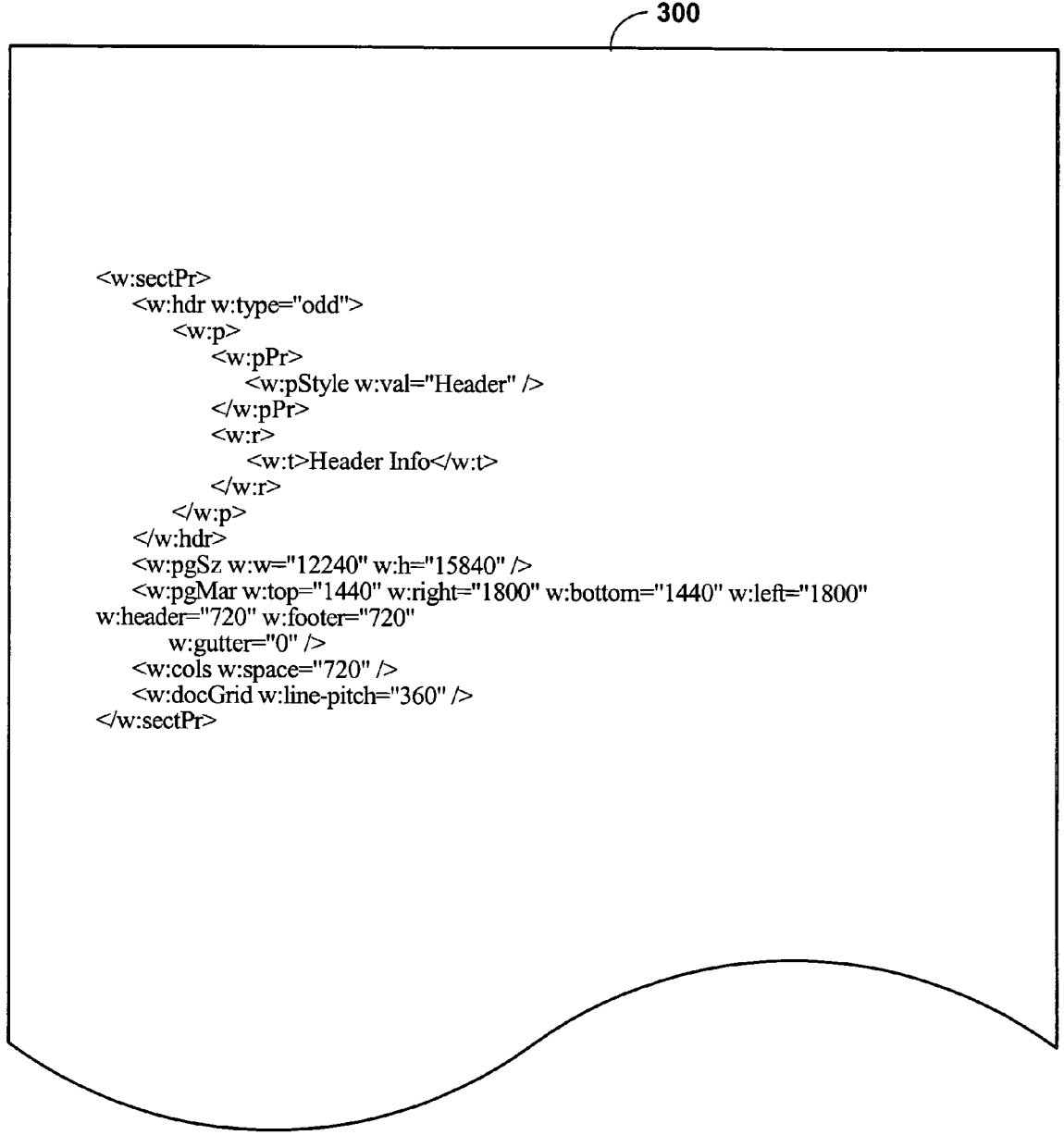
FIG. 3 illustrates an exemplary portion of an ML file that provides representation of an exemplary header within the ML file.

FIG. 3 illustrates an exemplary portion of an ML file that provides representation of an exemplary header within the ML file, in accordance with aspects of the present invention. The header example shown displays the text "Header Info" at the top of the odd pages in the document produced from the ML file.

Analyzing the example shown in FIG. 3, the header type is designated as "odd". Accordingly, the text "Header Info" is displayed on the odd pages of the document produced from the ML file. The portion of the ML file shown also includes a designation of the size of the pages, the margins associated with each page, and the positioning of the header within each page. In further embodiments, a variety of fields other than the text shown may be associated with the header. Accordingly, the properties and functionality of the header stored in the ML file is not limited to the example shown, and a number of variations for a header are available.

Headers and footers are specific to a particular section. Many documents only consist of one section, but that is not always the case. Because documents may include more than one section, the header and footer information is stored with the section properties. There are two elements in the section properties tag: <hdr> and <ftr>. These are option elements, and they are each of type hdrElt and ftrElt respectively. In one embodiment, the types of option elements are substantially the same, but the schema defines them separately.

The hdrElt shown in the example ML file includes the following:

TABLE 1

| ref =<br>"aml:annotation" | | xmlns =<br>"http://schemas.microsoft.com/aml/2001/core" |
|---|---|---|
| cfChunk | [cfChunkElt] | 'Context-Free' Chunk--allows inline definition of stylesheet, font, and list items |
| p | [pElt] | Paragraph element; analogous to HTML <p> tag |
| tbl | [tblElt] | Table element; analogous to HTML <table> |

In one embodiment, the definitions for the header and footer elements are substantially the same as those of the body element of the document. Accordingly, headers and footers may be described as "mini-documents" due to their similarity to the body element.

In one embodiment, a type attribute is associated with the header or footer. The type attribute provides functionality for multiple headers & footers to be associated with any one section. In one example, the type attribute may be set up such that a header only appears on even pages; only appears on odd pages; or only appears on the first page.

Figure 4:
FIG. 4 illustrates an exemplary portion of an ML file that provides representation of an exemplary header within the ML file.

FIG. 4 illustrates an exemplary portion of an ML file that provides representation of an exemplary header within the ML file, in accordance with aspects of the present invention. The footer example shown displays the text "Footer Info" at the bottom of the odd pages within the document produced from the ML file.

Analyzing the example shown in FIG. 4, the footer type is designated as "odd". Accordingly, the text "Footer Info" is displayed on the odd pages of the document produced from the ML file. The portion of the ML file shown also includes a designation of the size of the pages, the margins associated with each page, and the positioning of the footer within each page. The example of the footer shown in FIG. 4, is similar to the example for the header shown in FIG. 3. In further embodiments, a variety of fields other than the text shown may be associated with the footer. Accordingly, the properties and functionality of the footer stored in the ML file is not limited to the example shown, and a number of variations for a footer are available.

The following is an exemplary portion of schema that includes the section properties element as well as the schema for generating the header and footer mini-documents along with the type attribute, in accordance with aspects of the present invention:

Schema definition of Section Properties element:
<xsd:complexType name="sectPrElt">
 <xsd:sequence>
  <xsd:element name="hdr" type="hdrElt" minOccurs="0"
maxOccurs="3">
   <xsd:annotation>
    <xsd:documentation>Headers that appear at the
top page in this section.</xsd:documentation>
   </xsd:annotation>
  </xsd:element>
  <xsd:element name="ftr" type="ftrElt" minOccurs="0"

-continued maxOccurs="3">
   <xsd:annotation>
    <xsd:documentation>Footers that appear at the top
of the page in this section.</xsd:documentation>
   </xsd:annotation>
  </xsd:element>
  <xsd:element name="footnotePr" type="ftnEdnPropsElt"
minOccurs="0">
   <xsd:annotation>
    <xsd:documentation>Footnote properties for this
section</xsd:documentation>
   </xsd:annotation>
  </xsd:element>
  <xsd:element name="endnotePr" type="ftnEdnPropsElt"
minOccurs="0">
   <xsd:annotation>
    <xsd:documentation>Endnote properties for this
section</xsd:documentation>
   </xsd:annotation>
  </xsd:element>
  <xsd:element name="type" type="sectTypeElt" minOccurs="0">
   <xsd:annotation>
    <xsd:documentation>Section
type.</xsd:documentation>
   </xsd:annotation>
  </xsd:element>
  <xsd:element name="pgSz" type="pageSzType"
minOccurs="0">
   <xsd:annotation>
    <xsd:documentation>Specifies the size and
orientation of this page.</xsd:documentation>
   </xsd:annotation>
  </xsd:element>
  <xsd:element name="pgMar" type="pageMarType"
minOccurs="0">
   <xsd:annotation>
    <xsd:documentation>Specifies the page
margins>/xsd:documentation>
   </xsd:annotation>
  </xsd:element>
<xsd:element name="paperSrc" type="paperSourceType"
  minOccurs="O">
   <xsd:annotation>
    <xsd:documentation>Specifies where the paper is
located in the printer. </xsd:documentation>
   </xsd:annotation>
  </xsd:element>
  <xsd:element name="pgBorders" type="pageBordersType"
minOccurs="0">
   <xsd:annotation>
    <xsd:documentation>Specifies the page
borders.</xsd:documentation>
  </xsd:annotation>
  </xsd:element>
  <xsd:element name="lnNumType"type="lineNumberType"
   minOccurs="0">
<xsd:annotation>
    <xsd:documentation>Specifies the line
numbering.</xsd:documentation>
   </xsd:annotation>
  </xsd:element>
  <xsd:element name="pgNumType" type="pageNumberType"
minOccurs="0">
   <xsd:annotation>
    <xsd:documentation>Specifies the page
numbering options.</xsd:documentation>
   </xsd:annotation>
  </xsd:element>
  <xsd:element name="cols" type="columnsType"
minOccurs="0">
   <xsd:annotation>
    <xsd:documentation>Specifies the column
properties for this section/xsd:documentation>
   </xsd:annotation>
  </xsd:element>
  <xsd:element name="formProt"type="onOffProperty"
minOccurs="0">
   <xsd:annotation>
    <xsd:documentation>Turns protection on for this section alone.</xsd:documentation>
      /xsd:annotation>
    </xsd:element>
    <xsd:element name="vAlign" type="verticalJustificationType" minOccurs="0">
      <xsd:annotation>
        <xsd:documentation>Sets alignment for text vertically between the top and bottom margins</xsd:documentation>
      </xsd:annotation>
    </xsd:element>
    <xsd:element name="noEndnote" type="onOffProperty" minOccurs="0">
      <xsd:annotation>
        <xsd:documentation>Suppresses endnotes that would ordinarily appear at the end of this section.</xsd:documentation>
      </xsd:annotation>
    </xsd:element>
    <xsd:element name="titlePg" type="onOffProperty" minOccurs="0">
      <xsd:annotation>
        <xsd:documentation>The first page of this section is different and will have different headers/footers.</xsd:documentation>
      </xsd:annotation>
    </xsd:element>
    <xsd:element name="textFlow" type="textDirectionProperty" minOccurs="0">
      <xsd:annotation>
        <xsd:documentation>Specifies text flow</xsd:documentation>
      </xsd:annotation>
    </xsd:element>
    <xsd:element name="bidi" type="onOffProperty" minOccurs="0">
      <xsd:annotation>
        <xsd:documentation>This section contains bi-directional (Complex Scripts) text</xsd:documentation>
      </xsd:annotation>
    </xsd:element>
    <xsd:element name="rtlGutter" type="onOffProperty" minOccurs="0">
      <xsd:annotation>
        <xsd:documentation>Positions the gutter at the right of the document.</xsd:documentation>
      </xsd:annotation>
    </xsd:element>
    <xsd:element name="docGrid" type="docGridType" minOccurs="0">
      <xsd:annotation>
        <xsd:documentation>Specifies the document grid</xsd:documentation>
      </xsd:annotation>
    </xsd:element>
    <xsd:element ref="aml:annotation" minOccurs="0" maxOccurs="1">
      <xsd:annotation>
        <xsd:documentation>Revision marking for the section properties.</xsd:documentation>
      </xsd:annotation>
    </xsd:element>
  </xsd:sequence>
</xsd:complexType>
Schema definition of Header element:
<xsd:complexType name="hdrElt">
  <xsd:annotation>
    <xsd:documentation>Headers are areas at in the top margin of each page in the current section.</xsd:documentation>
  </xsd:annotation>
  <xsd:sequence>
    <xsd:choice maxOccurs="unbounded">
      <xsd:element ref="aml:annotation"minOccurs="0" maxOccurs="unbounded"></xsd:element>
      <xsd:element name="cfChunk" type="cfChunkElt" minOccurs="0" maxOccurs="unbounded">
        <xsd:annotation>
          <xsd:documentation>'Context-Free' Chunk --allows inline definition of stylesheet, font, and list items</xsd:documentation>
        </xsd:annotation>
      </xsd:element>
      <xsd:element name="p" type="pElt" minOccurs="0" maxOccurs="unbounded">
        <xsd:annotation>
          <xsd:documentation>Paragraph element; analogous to HTML <p> tag</xsd:documentation>
        </xsd:annotation>
      </xsd:element>
      <xsd:element name="tbl" type="tblElt" minOccurs="0" maxOccurs="unbounded">
        <xsd:annotation>
          <xsd:documentation>Table element; analogous to HTML <table></xsd:documentation>
        </xsd:annotation>
      </xsd:element>
    </xsd:choice>
  </xsd:sequence>
  <xsd:attribute name="type" type="hdrValue" use="required">
    <xsd:annotation>
      <xsd:documentation>Specifies the header type</xsd:documentation>
    </xsd:annotation>
  </xsd:attribute>
</xsd:complexType>
Schema definition of type attribute:
<xsd:simpleType name="hdrValue">
  <xsd:annotation>
    <xsd:documentation>Specifies the header type</xsd:documentation>
  </xsd:annotation>
  <xsd:restriction base="xsd:string">
    <xsd:enumeration value="even">
      <xsd:annotation>
        <xsd:documentation>Header will occur on all even numbered pages.</xsd:documentation>
      </xsd:annotation>
    </xsd:enumeration>
    <xsd:enumeration value="odd">
      <xsd:annotation>
        <xsd:documentation>Header will occur on all odd numbered pages.</xsd:documentation>
      </xsd:annotation>
    </xsd:enumeration>
    <xsd:enumeration value="first">
      <xsd:annotation>
        <xsd:documentation>Header will occur on the first page of each section.</xsd:documentation>
      </xsd:annotation>
    </xsd:enumeration>
  </xsd:restriction>
</xsd:simpleType>
Schema definition of Footer element:
<xsd:complexType name="ftrElt">
  <xsd:annotation>
    <xsd:documentation>Footers are areas at in the bottom margin of each page in the current section</xsd:documentation>
  </xsd:annotation>
  <xsd:sequence>
    <xsd:choice maxOccurs="unbounded">
      <xsd:element ref="aml:annotation" minOccurs="0" maxOccurs="unbounded"></xsd:element>
      <xsd:element name="cfChunk" type="cfChunkElt" minOccurs="0"maxOccurs="unbounded">
        <xsd:annotation>
          <xsd:documentation>'Context-Free'Chunk --allows inline definition of stylesheet, font, and list items</xsd:documentation>
        </xsd:annotation>
      </xsd:element>
      <xsd:element name="p" type="pElt" minOccurs="0" maxOccurs="unbounded">
        <xsd:annotation>
          <xsd:documentation>Paragraph element; analogous to HTML <p> tag</xsd:documentation>
        </xsd:annotation>
      </xsd:element>
      <xsd:element name="tbl" type="tblElt" minOccurs="0" maxOccurs="unbounded">
        <xsd:annotation>

-continued

```
            <xsd:documentation>Table element;
analogous to HTML <table></xsd:documentation>
          </xsd:annotation>
        </xsd:element>
      </xsd:choice>
    </xsd:sequence>
    <xsd:attribute name="type" type="ftrValue" use="required">
      <xsd:annotation>
        <xsd:documentation>Specifies the footer
type.</xsd:documentation>
      </xsd:annotation>
    </xsd:attribute>
</xsd:complexType>
```

Figure 5:
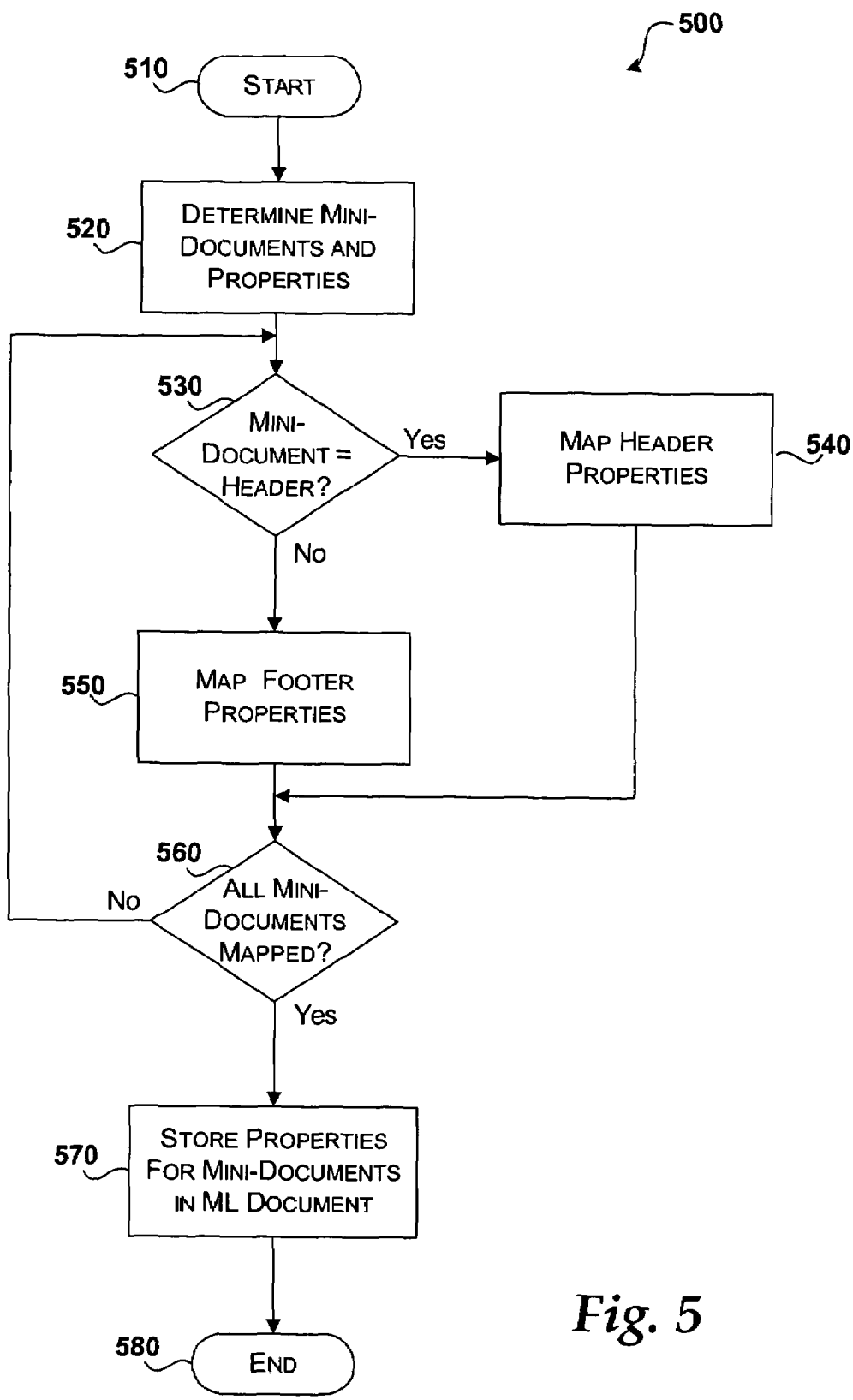
FIG. 5 shows an exemplary flow diagram for representing header and footer structures in a ML document, in accordance with aspects of the invention.

FIG. 5 shows an exemplary flow diagram for representing header and footer information in a ML document, in accordance with aspects of the invention. After start block 510, the process flows to block 520 where the mini-document information described within a document such as a word-processor document, is determined. The mini-document information used within a document may include many different headers and footers, including those that are not natively supported by later applications parsing the document. Once the mini-document information is determined, processing proceeds to decision block 530.

At decision block 530, a determination is made whether a mini-document corresponds to a header or a footer. When the mini-document being examined is a header, processing moves to block 540. However, if the mini-document is not a header, the mini-document is a footer and processing moves to block 550. In another embodiment, the mini-document information may describe other structures than headers and footers.

At block 540, the properties of the header (when the mini-document is a header) are mapped into elements, attributes, and values of the ML file. As an example, the header may include a mini-document that displays the text "confidential" at the top of each page. Three elements that may be used in mapping the properties of a header include the cfChunkElt, the pElt, and tblElt elements (see Table 1). The headers and the properties associated with the headers may change from page to page, section to section, chapter to chapter and the like. There may be more than one mapping, therefore, per document. Once the header properties are mapped, or written to the ML file, processing advances to decision block 560.

Returning to block 550, the properties of the footer (when the mini-document is a footer) are mapped into elements, attributes, and values. Exemplary elements used in mapping the properties of a footer include the cfChunkElt, the pElt, and tblElt elements (see Table 1). As previously stated, the footers and the properties associated with the footers may change from page to page, section to section, chapter to chapter and the like. There may be more than one mapping, therefore, per document. After the footer properties are mapped, processing advances to decision block 560.

At decision block 560, a determination is made whether all the mini-documents of the document have had their properties mapped to elements, attributes, and values. If not all of the mini-documents have been processed, processing returns to block 530 where the next mini-document is examined to determine whether the mini-document is a header. However, if all the mini-documents have been processed, then the process then moves to block 570.

At block 570, the properties of the mini-documents are stored in a ML document that may be read by applications that understand the ML. Once the properties are stored, processing moves to end block 580 and returns to processing other actions.

In another embodiment, the properties of each mini-document are mapped to elements, attributes, and values without a distinction being made between headers and footers.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for representing header and footer structures in a markup language document, comprising:

determining properties corresponding to a mini-document of at least one section of a word processing application document generated on a word processing application, wherein the mini-document includes a body portion, wherein the mini-document includes at least one member of a group comprising: a header and a footer;

individually mapping the properties of the mini-document into a markup language element that is stored with each of the markup language section properties of the application document, wherein individually mapping the properties includes:

setting an option element in the mini-document markup language element, wherein the option element includes at least one member of a group comprising: a header value and a footer value, setting a type attribute in the mini-document markup language element, wherein the type attribute includes a value that indicates an occurrence pattern of the body of the mini-document within the application document, setting page size properties of the application document in the section properties of the application document, wherein the page size properties includes a size value of the page, and setting a margin properties of the application document in the section properties of the application document, wherein the margin properties include a top margin value, a bottom margin value, a left margin value, a right margin value and a position value of the location of the mini-document within the section of the application document;

storing each of the individually mapped properties of the mini-document in the markup language document;

validating the markup language document in accordance with a native schema of the word processing application having definitions for the mini-document, wherein the definitions for the mini-document include a definition for headers, a definition for footers, a definition for a context free chunk, a definition for a paragraph element, a definition for a table element and a definition for a mini-document type; and parsing and rendering the markup language document on an application other than the word processing application, wherein the application other than the word processing application does not have access to the native schema of the word processing application having the definitions of the mini-document, wherein the individually mapped option element in the section properties causes the rendering of at least one member of a group comprising, a header according to the header value for the section, and a footer according to the footer value for the section, wherein the individually mapped type attribute in the section properties causes the body portion of the mini-document to be rendered in accordance with the occurrence pattern of the section, wherein the value is at least one member of a group comprising: an odd page value for the section and an even page value for the section, wherein the individually mapped page size properties for the section causes the page to be rendered according to the size value of the page of the section, and wherein the individually mapped margin properties for the section causes the rendering of a top margin according to the top margin value, a bottom margin according to the bottom margin value, a left margin according to the left margin value, a right margin according to a right margin value and a mini-document position according to the position value of the location of the mini-document within the section.

2. The method of claim 1, further comprising:

determining properties corresponding to an additional mini-document that relates to at least one section of the application document;

mapping the properties of the additional mini-document into a markup language element, wherein mapping includes mapping the properties into at least one member of a group comprising: a context free chunk element and a table element; and storing the properties of the additional mini-document in the markup language document.

3. The method of claim 1, further comprising:

determining whether properties associated with all mini-documents of the application document have been stored in the markup language document; and processing further mini-documents when the properties associated with all mini-documents have not been stored in the markup language document.

4. The method of claim 1, wherein the properties of the mini-document stored in the markup language document are understood by an application that understands the markup language when the mini-document is not native to the application.

5. The method of claim 1, wherein the markup language document is manipulated on a server to substantially reproduce the mini-document of the application document notwithstanding the presence of an application that generated the markup language document.

6. A computer-readable storage medium for representing headers and footers in a markup language document, comprising:

determining properties relating to a mini-document used within a word-processing document generated on a word-processing application, wherein the mini-document includes a body portion having text;

determining whether the mini-document is at least one member of a group comprising: a header and a footer;

individually writing the properties into each of the section properties markup language elements associated with the word processing document, wherein individually writing the properties includes:

writing an option element in the mini-document markup language element, wherein the option element includes at least one member of a group comprising: a header value and a footer value, setting a type attribute, wherein the type attribute includes a value that indicates an occurrence pattern of the body of the mini-document within the application document, wherein upon rendering the markup language document, the type attribute causes the body portion of the mini-document to be repeated in the application in accordance with the occurrence pattern, and setting a margin properties of the application document in the section properties of the application document, wherein the margin properties include a numerical position value of the location of the mini-document within the section of the word-processing document;

storing each of the individually written properties in the markup language document;

validating the markup language document in accordance with a native schema of the word processing application having definitions for the mini-document; and parsing and rendering the markup language document on an application other than the word processing application, wherein the application other than the word processing application does not have access to the native schema of the word processing application having the definitions of the mini-document, wherein the markup language document is rendered according to the properties individually written to the section properties markup language elements.

7. The computer-readable storage medium of claim 6, wherein the markup language document is manipulated on a server to substantially reproduce the mini-document of the word-processing document notwithstanding the presence of an application that generated the markup language document.

8. The computer-readable storage medium of claim 6, wherein the properties of the mini-document stored in the markup language document are understood by an application that understands the markup language when the mini-document is not native to the application.

9. The computer-readable storage medium of claim 6, wherein the type attribute corresponds to whether the mini-document occurs on at least one member of a group comprising: odd pages of the specified section of the application document, or even pages of the specified section of the application document.

10. The computer-readable storage medium of claim 6, further comprising:

determining properties corresponding to an additional mini-document that relates to at least one section of the word-processing document;

mapping the properties of the additional mini-document into a markup language element, wherein mapping includes mapping the properties into at least one member of a group comprising: a context free chunk element and a table element; and storing the properties of the additional mini-document in the markup language document.

11. The computer-readable storage medium of claim 6, further comprising:

determining whether properties associated with all mini-documents of the word-processing document have been stored in the markup language document; and processing further mini-documents when the properties associated with all mini-documents have not been stored in the markup language document.

12. A system for representing header and footer information in a markup language document, comprising:

a processor; and a memory associated with computer-executable instructions configured to:

determine properties relating to a mini-document included in at least one section of a word processing application document generated on a word processor, wherein the mini-document includes a body portion having text;

determine whether the mini-document is at least one member of a group comprising: a header and a footer;

individually map the properties into a markup language element that is stored with markup language section properties of the sections of the application document, wherein individually mapping the properties includes:

setting an option element in the mini-document markup language element, wherein the option element includes at least one member of a group comprising:

a header value and a footer value, setting a type attribute, wherein the type attribute includes a value that indicates an occurrence pattern of the body of the mini-document within the application document, setting a margin properties of the application document in the section properties of the application document, wherein the margin properties include a position value of the location of the mini-document within the section of the application document, and store each of the individually mapped properties in the markup language section properties of the application document;

a validation engine configured to validate the markup language document; and an application other than the word processing application, wherein the application other than the word processing application does not have access to the native schema of the word processing application having the definitions of the mini-document, wherein the markup language document is parsed and rendered by the application other than the word processing application according to the properties individually written to the section properties markup language elements.

13. The system of claim 12, wherein the word processing application is further configured to:

determine properties corresponding to an additional mini-document that relates to at least one section of the application document;

map the properties of the additional mini-document into a markup language element, wherein mapping includes mapping the properties into at least one member of a group comprising: a context free chunk element and a table element; and store the properties of the additional mini-document in the markup language document.

14. The system of claim 12, wherein the application is further configured to:

determine whether properties associated with all mini-documents of the application document have been stored in the markup language document; and process further mini-documents when the properties associated with all mini-documents have not been stored in the markup language document.

15. The system of claim 12, wherein the properties of the mini-document stored in the markup language document are understood by the application other than the word processing application that understands the markup language when the mini-document is not native to the application other than the word processing application.

16. The system of claim 12, wherein the markup language document is manipulated on a server to substantially reproduce the mini-document of the application document notwithstanding the presence of the application that generated the markup language document.

* * * * *